July 28, 1959 D. LOEV 2,897,483
HIGH-SPEED COUNTER
Filed Oct. 8, 1954
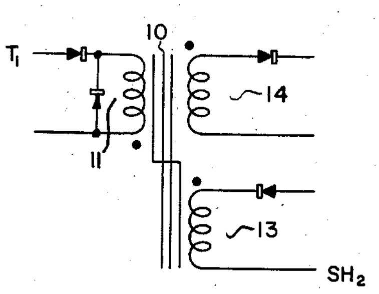
Fig.1A
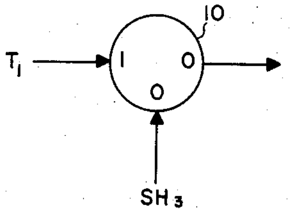
Fig.1B
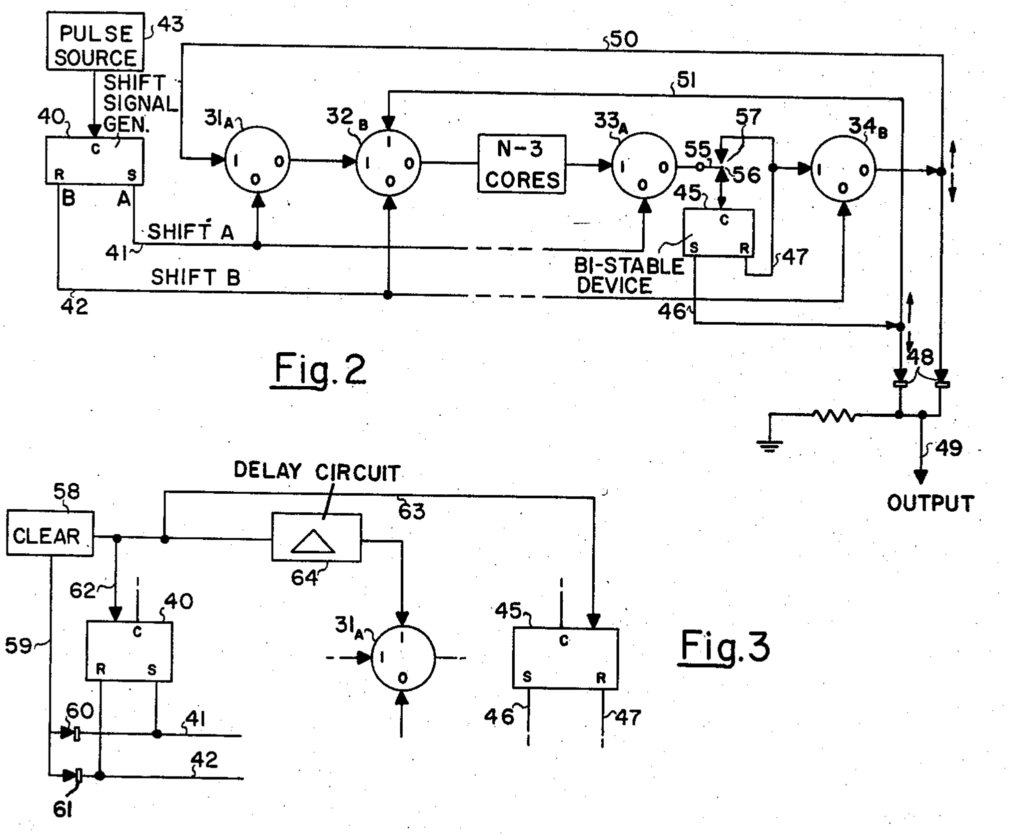
Fig.2, Fig.3
| COUNT | MAGNETIC CORE ELEMENTS 31A | 32B | 33A | 34B |
|---|---|---|---|---|
| 0 | 1 | 0 | 0 | 0 |
| 1 | 0 | 1 | 0 | 0 |
| 2 | 0 | 0 | 1 | 0 |
| 0' | 0 | 1 | 0 | 0 |
| 1' | 0 | 0 | 1 | 0 |
| 2' | 0 | 0 | 0 | 1 |
| 0 | 1 | 0 | 0 | 0 |
COUNTER OUTPUT SIGNAL ON CONDUCTOR 49 (row 0')
COUNTER OUTPUT SIGNAL ON CONDUCTOR 49 (row 0)
Fig.4
INVENTOR.
DAVID LOEV
BY Thomas B. Horton
AGENT 2,897,483

HIGH-SPEED COUNTER

David Loev, Plymouth, Pa., assignor to Burroughs Corporation, Detroit, Mich., a corporation of Michigan Application October 8, 1954, Serial No. 461,240

6 Claims. (Cl. 340—174)

This invention relates to high-speed counters and more particularly to counters employing static magnetic elements.

Shift registers employing static magnetic elements for the storage of binary information are well known in the art as evidenced by articles such as "An Electronic Digital Computer" written by A. D. Booth and published in Electronic Engineering for December 1950. Many known counters have been devised which make use of the magnetic core shift register principles disclosed therein. For example, in a known counter in order to count the number N, N pairs of static magnetic elements are connected in a ring. Each pair of elements includes a count element and an intermediate storage element, and count signals and shift pulses are applied alternately to all the count elements and to all of the intermediate storage elements respectively to advance a reference bit along the rig. This circuit using two static magnetic elements per count is expensive with respect to the number of cores used.

Evidently, a circuit of the magnetic shift register type which utilizes essentially only one core per count would represent a considerable step forward in the art.

It is a general object of this invention to advance the art of using static magnetic elements.

It is a specific object of this invention to provide an improved high-speed counter.

It is a further object of the invention to provide a high-speed, static magnetic element, shift-register type counter which is economical with respect to the number of elements used.

It is another object of the invention to provide a new method of operating a shift register circuit to count pulses.

According to the invention a modulo odd-number counter for counting the odd number N comprises in combination $(N+1)$ storage elements, two control elements, and means coupling the output circuits of all of the storage elements except the Nth with the input circuits of the following storage elements and coupling the output circuit of the $(N+1)^{th}$ storage element with the input circuit of the first storage element. One of said control elements is coupled both between the output circuit of the Nth storage element and the input circuit of the $(N+1)^{th}$ storage element and between the output circuit of the Nth storage element and the input circuit of the second storage element to alternately produce input signals to the $(N+1)^{th}$ storage element and to the second storage element in response to output signals from the Nth element. The second control element is driven by input signals from a source of signals to be counted and is coupled to all of the storage elements to shift signals from one element to another in response to said input signals. A reference bit is provided in one of the storage elements to be circulated among said storage elements in response to the input signals. Means are provided for taking counter output signals alternately from the Nth and the $(N+1)^{th}$ storage elements in response to the presence of the reference bit.

According to a further embodiment of the invention a modulo-even-number counter for counting an even number M comprises M storage elements, a control element, and means coupling the output circuits of all of the storage elements to the input circuits of the following storage elements in a ring. The control element is driven by input signals from a source of signals to be counted and is coupled to all of the elements to shift signals from one element to another element in response to said input signals. A reference bit is provided in one of the storage elements to be circulated around said ring in response to said input signals. Means are provided for taking output signals from the Mth storage element in response to the presence of the reference bit.

The method of the invention for operating a group of interconnected magnetic elements comprises the steps of storing at least one reference bit in the register, passing the bit from element to element in response to external signals, producing two closed paths for flow of the bit among the elements, and deriving output signals from either of the two closed paths.

Other objects and advantages will become apparent when read in light of the accompanying drawings in which:

Fig. 1A is a schematic drawing of a magnetic storage element used in the present invention;

Fig. 1B is a logical diagram of the magnetic storage element illustrated by Fig. 1A;

Fig. 2 is a logical diagram of a high-speed counter constructed according to the present invention;

Fig. 3 is a logical diagram of resetting means for the counter of Fig. 2;

Fig. 4 is a chart illustrating the logical operation of the counter of Fig. 2.

Before entering into a detailed description of the invention, one of the storage elements, in this instance, static magnetic storage elements, which are combined in a novel manner to comprise the high-speed counter of the invention will be described completely.

Referring to Fig. 1A, a magnetic storage core 10 is schematically drawn to represent a material having a rectangular hysteresis characteristic, having the capability of being shifted from one to the other of two stable storage states, and having the propensity of remaining in the state to which it is shifted. About the core 10 are several windings 11, 13, and 14 each of which has a diode associated therewith to indicate the direction of current flow through the respective windings. At either end of the windings the dot notation is utilized to indicate the direction of flux established in the core by the excitation of the windings from an external source. Thus, if current enters the dotted end of the winding a remanent state is established in the core which may be arbitrarily designated as the "0" remanence state. Conversely if the current enters the non-dotted end of the winding, a remanent state designated "1" is established. Functionally the windings 11, 13, and 14 are respectively employed as input signal means, shift or interrogating means, and output signal means. If a direct current signal source of suitable polarity is available, the diodes associated with input windings 11 and 13 are not required. The diode in series with output winding 14 permits an output signal only when the core is switched from the storage state (for example), "1," to the opposite storage state, "0."

Information is supplied to input winding 11 in the form of signals $T_1$ of the on-off binary type which produce current flow for the condition "1" only. Thus, application of a binary one effects current flow in winding 11, and core 10 is saturated to its "1" condition. Conversely application of a binary zero to said winding produces no current flow in winding 11 and core 10 which, as will be shown, is already in its "0" condition retains said condition.

In order to shift stored information out of core 10, a shift pulse $SH_2$ is applied to winding 13 in order to restore said core to its "0" state. If at the time signal $SH_2$ is applied, said core is in its "1" state, a large flux change occurs when the core switches from "1" to "0"; and in response thereto a large output signal is induced in output winding 14. However, if the core is already in its "0" condition at the time the shift pulse is applied, no appreciable flux change occurs; and no output signal is forthcoming from winding 14. The subscripts associated with the information signals $T_1$ and $SH_2$ conveniently indicate the relative order in which said signals occur. Each information input signal always finds the core 10 in its "0" condition as a result of the previous shift signal.

Fig. 1B illustrates the logical symbolism which is used hereinafter to simplify the description of the invention. Each static magnetic core element is designated by a circle 10 with input leads and output leads being designated respectively by arrows entering and leaving the circle. The storage state into which the input pulses drive the core 10 are designated by the binary notation at the end of the input leads. In similar manner the binary notation at the output lead indicates that an output signal will occur when the state of the core is changed from the opposite binary state to that indicated.

Referring to Fig. 2 a high-speed counter employing the magnetic elements described hereinabove is constructed according to the invention. The counter is to be discussed first as adapted to the counting of some odd number N and later to be discussed as adapted to the counting of some even number M.

In order to count any odd number N, a first static magnetic element $31_A$, a second static magnetic element $32_B$, $(N-3)$ intermediate static magnetic elements, a next-to-last static magnetic element $33_A$, and a last static magnetic element $34_B$ are required. The number of intermediate static magnetic elements is dependent upon the odd number N which it is desired to count; for example, for a modulo 3 counter the number of intermediate static magnetic cores required is (3—3) or zero; for a modulo 5 counter the number of intermediate static magnetic elements is (5—3) or 2; and so on. The total number of static magnetic elements required to count N are the four elements, $31_A$, $32_B$, $33_A$, $34_B$, and the $(N-3)$ intermediate elements, or a total of $(N+1)$ elements.

For the purpose of discussing the invention, let it be assumed that a modulo 3 counter is desired whereupon there are no intermediate static magnetic elements. With the exception of the last magnetic element $34_B$ all of the magnetic cores are connected in a series chain; that is, the input winding of each core is connected for control by the signals produced in the output winding of the preceding core. Alternate static magnetic elements $31_A$ and $33_A$ comprise a first plurality A of magnetic elements having their shift windings commonly controlled by the shift signals produced on the first output conductor 41 of shift signal generator 40, and alternate magnetic core element $32_B$ and $34_B$ comprise a second plurality B of magnetic elements having their shift windings commonly controlled by the shift signals produced on the second output conductor 42 of said shift signal generator. For convenience, the A and B notation has been added as a subscript to the reference characters denoting the magnetic elements. It is to be understood that if the number to be counted is greater than 3, the shift windings of the $(N-3)$ intermediate magnetic core elements also fall into the A and B groupings for control by shift signal generator 40. Shift signal generator 40 may be any one of several well known bi-stable devices modified to produce a pulse output rather than to produce merely a change in D.-C. potential level; for example, a vacuum tube flip-flop, a ferro-resonant magnetic flip-flop or a relay. A pulse source 43 supplies the bi-stable device which comprises shift signal generator 40 with the pulses to be counted; and in response to each pulse received at its complementing input terminal C, the bi-stable device changes its state and thereby applies shift signals alternately to conductors 41 and 42.

The transfer loop that couples core $31_A$ to core $32_B$ will consist of an output winding such as winding 14 associated with core $31_A$ and an input winding such as winding 11 associated with core $32_B$, such windings being connected by a diode to form a closed loop. When core $32_B$ switches from its "1" state to its "0" state, not only is there a transfer of such "1" to the next adjacent core to the right of core $32_B$, but there is the possibility of a backward transfer of such "1" to core $31_A$ through the transfer loop coupling cores $31_A$ and $32_B$. Such undesired backward transfer is avoided either by employing a shunting diode in the transfer loop as shown in Fig. 1A or by employing a favorable turns ratio between the output winding of a core such as core $31_A$ and an input winding of a core such as core $32_B$. Such favorable turns ratio requires that there be more turns in the output winding 14 than in the input winding 11 of the above described transfer loop. Such means for preventing backward transfer of a "1" are well known and are discussed in the Wilson Patent No. 2,652,501 issued on September 15, 1953.

As stated hereinbefore, the next-to-last static magnetic element $33_A$ does not directly drive the last static magnetic element $34_B$. Rather, the signals produced in the output winding of the next-to-last magnetic element $33_A$ are applied through contact 56 of a switch 55 to the triggering complementing input C of a bi-stable device 45 which may be of the same sort as the bi-stable device which comprises shift signal generator 40. In turn the signals produced on conductor 47 of bi-stable device 45 are applied to the input winding of the last static magnetic element $34_B$. An "or" gate 48 having counter output line 49 projected therefrom has for one input the signals produced on conductor 46 of bi-stable device 45 and for a second input the output signals of the last static magnetic element $34_B$. "Or" gate 48 is not necessarily restricted to the diode gate shown in the drawings, but may be any known two-input circuit which produces an output when the proper signal is applied to either input. Finally, a first feedback loop 50 applies the output signals of the last static magnetic element $34_B$ to the input winding of first static magnetic element $31_A$, and a second feedback loop 51 applies the signals provided on conductor 46 of bi-stable device 45 to an additional input winding on the second static magnetic element $32_B$. Said additional input winding may be identical with the information input winding 11 described hereinabove in connection with the description of the basic magnetic element of Fig. 1A and, as will be shown, operates independently of the normal input winding to set said element $32_B$ to its "1" state.

In order to initially condition the counter, that is, to reset the counter to indicate a zero count, resetting means of the sort disclosed by Fig. 3 may be provided. For convenience only, those portions of the counter which are considered necessary to an understanding of the resetting means have been illustrated, and these bear the same reference characters as in Fig. 2. A clear signal generator 58 is connected by lead 59 and diodes 60 and 61 to shift conductors 41 and 42. Said clear signal generator is also connected via leads 62 to the "reset" side of the bi-stable device which comprises shift signal generator 40 and via lead 63 to the "reset" side of bi-stable device 45. Additionally, the clear signal generator is connected through a delay circuit 64 to an auxiliary input winding of static magnetic element $31_A$. In order to initially condition said counter the clear signal generator 58 is operated to apply a clear signal via the conductor 41 and 42 to the shift windings of all of the storage elements $31_A$–$34_B$ and thereby restore them to a "0" state. Coincidently, the clear signal effects resetting of both shift signal generator 40 and bi-stable device 45. Delay circuit 64 delays the application of the clear signal to storage element $31_A$ until the rest of the circuit has been completely restored to its zero representing status whereupon said delayed clear signal effects setting of static magnetic element $31_A$ to its "1" condition. The operation of flip-flops 40 and 45 is shown and disclosed on pages 8–VIII—10–14 of the Computation Laboratory (Harvard University) Progress Report #8, Contract Number W19–122—ac–24, February 10–May 10, 1950, relating to Static Magnetic Circuits. Another flip-flop circuit which boxes 40 and 45 represent is shown as Figures 3–1 on page 14 of the text "High-Speed Computing Devices"—by the staff of Engineering Research Associates, Inc., published by McGraw-Hill Book Company, Inc., New York, 1950.

In tracing through the operation of the modulo 3 counter of Fig. 2, consider the chart of Fig. 4 which illustrates the condition of each core element in response to each pulse to be counted and note that a counter output signal is produced on counter output conductor 49 for every third pulse counted. Initially, the counter stands at zero count which, as described hereinbefore, is designated by a "1" in magnetic core $31_A$ and a "0" in all other cores. The first pulse to be counted sets the bi-stable device 40 to create a shift signal on output line 41 thereof which is applied to the A group of magnetic elements $31_A$ and $33_A$. The shift pulse A effects restoration of magnetic element $31_A$ from its "1" condition to its "0" condition, and an output pulse is produced by said element which in turn drives core $32_B$ to its "1" condition. Because core $33_A$ is already in its "0" state, the first shift pulse produces no change therein. Upon occurrence of the second pulse to be counted, bi-stable device 40 is reset and thereby produces a shift pulse on conductor 42 which is applied to the B group of magnetic elements, $32_B$ and $34_B$. In response thereto magnetic element $32_B$ which displays a "1" condition is returned to its "0" condition to produce a signal which effects setting of magnetic element $33_A$ to its "1" condition. Core $34_B$ already stands at "0," and obviously no change of state is produced by said second shift pulse. The third pulse to be counted sets bi-stable device 40 to effect production of a shift pulse which is applied via shift conductor 41 to the A group of magnetic elements $31_A$ and $33_A$. Magnetic element $31_A$ already at "0" undergoes no change in status. However, magnetic element $33_A$, standing at "1," is driven to its "0" condition, and the output signal derived therefrom causes setting of bi-stable device 45. Upon being set, bi-stable device 45 produces a signal on conductor 46 which operates "or" gate 49 to apply an output signal indicative of a three count to the counter output conductor 49. Additionally, the signal from bi-stable device 45 is routed via feedback loop 51 to the second input winding of magnetic element $32_B$ which is set to "1" thereby.

The counter has now completed what might be termed a sub-cycle, having completed a count of three and having produced a counter output signal so indicating. Upon completion of this sub-cycle the counter again stands at zero; however, the zero count in this instance is represented by a "1" in magnetic core element $32_B$, a "0" in all other magnetic elements, and bi-stable device 45 being in the set condition and may be referred to as count 0′. For convenience, all counts in the second sub-cycle, now to be described, are primed in Fig. 4.

Continuing, the first count of the second sub-cycle effects resetting of bi-stable device 40, and a shift signal is applied again to the B group of cores. Magnetic element $32_B$ is thereby restored from its "1" condition to a "0" condition and effects the storage of a "1" in succeeding magnetic element $33_A$. Obviously, magnetic element $34_B$ which is already at "0" remains at "0" in response to said first shift pulse. The second pulse to be counted sets bi-stable device 40 in order to apply a shift pulse to the A group and thereby cause magnetic element $33_A$ to be shifted from "1" condition to a "0" condition whereby core $33_A$ produces a pulse to reset bi-stable device 45. Resetting of bi-stable device 45 produces a signal on conductor 47 which effects entry of a "1" into magnetic element $34_B$. Finally, the third pulse to be counted effects application of a shift pulse to the B group, and core $34_B$ is restored to "0" to produce a signal which effects operation of "or" gate 48 to create a counter output signal on line 49 which is indicative of a three count. Further, the signal produced by core $34_B$ is fed back via loop 50 to set magnetic element $31_A$ to a "1" condition. Thus, a complete cycle comprising two sub-cycles of the counter circuit has been completed, and the counter stands again at its initial status representing zero.

It is believed readily apparent that the expansion of the counter to count a larger odd number N by the addition of a number $(N-3)$ of intermediate static magnetic elements between the second element $32_B$ and the next-to-last element $33_A$ in no way changes the operating principles disclosed hereinabove. This odd-number counter is very economical with respect to the number of cores used, requiring only $(N+1)$ cores to count any odd number N. Thus, for example, to count 19 requires the use of only 20 cores.

A very favorable core-to-count ratio is obtained when the odd-number counter is utilized to count even numbers which are double the count which represents the capacity of the odd-number counter. By utilizing either the output conductor 46 of bi-stable device 45 or the output conductor of the last static magnetic element, but not both, as the counter output conductor, a counter output signal is obtained for every two count cycles of the odd-number counter. Thus, with the modulo 3 odd number counter described above, an output signal is produced for every sixth count and only four cores are used. In similar manner to count ten requires only six cores, to count fourteen requires only eight cores; and generalizing, to count M requires only $$\left(\frac{M}{2}+1\right)$$

cores where M is 6, 10, 14, 18, 22, . . . etc.

With switch 55 moved to its upper position, the output winding of next-to-last magnetic storage element $33_A$ is connected via contact 57 directly to the input winding of last magnetic storage element $34_B$, and the counter becomes an even number counter having one core per count. Thus, with no intermediate storage cores the counter as shown by Fig. 2 is a modulo four counter when switch 55 is in its uppermost position. Each individual core works exactly the same as it does for the odd-number counter; however, the binary one, or reference bit, is now shifted straightforwardly from the first storage element through the last storage element and back to the first again, and an output is produced only when the reference bit is shifted from the last storage element to the first storage element.

It should be recognized that many modifications and variations of the above disclosed invention will occur to those skilled in the art which, however, still fall within the spirit and scope of the invention. Certain features believed to be indicative of the nature and scope of this invention are described with particularity in the appended claims.

What is claimed is:

1. A counter for counting every Nth signal, where N is any odd number other than "1," said counter comprising, in combination: a group of bistable storage elements equal in number to $N+1$, each of said storage elements having input, shift and output circuits; first and second bistable switching elements each having a complementing input circuit and two output circuits, each of said switching elements being adapted to deliver a current pulse from one or the other of its two output circuits when the said element is switched from one of its stable states to the other; means coupling an output circuit of each of the first $N$—1 number of storage elements directly to the input circuit of the following storage element, thereby to establish a row of N storage elements in which one of the elements is identified as the first storage element, the next as the second storage element, and the last as the Nth storage element; means coupling an output circuit of said Nth storage element to the complementing input circuit of said first of said bistable switching elements; an output circuit for said counter; means coupling one of the output circuits of said first switching element to said counter output circuit and to an input circuit of said second storage element in parallel; means coupling the other of said output circuits of said first switching element to an input circuit of the $(N+1)$th storage element, whereby signals are delivered alternately to the counter output circuit and to the (N+1)th storage element in response to successive output signals from the Nth element; means coupling an output circuit of said $(N+1)$th storage element to an input circuit of said first storage element and to said counter output circuit in parallel; means for entering a reference signal in said first of the storage elements; means for applying the pulses to be counted to the complementing input circuit of said second bistable switching element; means coupling one of the output circuits of said second switching element to the shift circuits of alternate of said $N+1$ number of storage elements; and means coupling the other output circuit of said second switching element to the shift circuits of the other alternate storage elements of said $N+1$ number of elements, thereby to shift said reference signal from said first storage element down the line of storage elements in step-by-step fashion in response to the signals to be counted, whereby output signals are derived alternately from the Nth and the $(N+1)$th storage elements in response to the shifting therefrom of said reference signal.

2. Apparatus as claimed in claim 1 characterized in that said bistable storage elements are magnetic cores capable of assuming either of two stable states of magnetic remanence.

3. Apparatus as claimed in claim 2 characterized in that the bistable switching elements are complementing flip flop circuits adapted to deliver pulse outputs when switched from one stable state to the other.

4. Apparatus as claimed in claim 3 characterized in that the counter output circuit includes an "or" gate to which said one output circuit of said first switching element and said output circuit of said $(N+1)$th storage element are connected.

5. Apparatus as claimed in claim 1 characterized in that means are provided for clearing the counter, said clearing means including reset signal means for placing said first storage element in the "1" state and all other storage elements in the "0" state and for placing said second switching element in such state that the first output signal therefrom is applied to the shift circuits of said alternate storage elements including said first storage element and for placing said first switching element in such state that the first output signal therefrom is applied to said counter output means and to said second storage element.

6. Apparatus as claimed in claim 5 characterized in that said clearing means includes a delay circuit interposed between said reset signal means and an input circuit of said first storage element thereby to place said first storage element in the "1" state after all other storage elements have been reset to the "0" state.

References Cited in the file of this patent

UNITED STATES PATENTS

| | | |
|---|---|---|
| 2,640,164 | Giel | May 26, 1953 |
| 2,652,501 | Wilson | Sept. 15, 1953 |
| 2,772,357 | An Wang | Nov. 27, 1956 |

OTHER REFERENCES

Journal of Applied Physics, January 1950.

Thesis by M. K. Haynes, pp. 33–35, 46–50 and 57–58, December 1950.